(12) United States Patent
Sakata et al.

(10) Patent No.: US 10,686,218 B2
(45) Date of Patent: *Jun. 16, 2020

(54) LITHIUM ION SECONDARY BATTERY AND NONAQUEOUS ELECTROLYTE FOR LITHIUM ION SECONDARY BATTERY

(75) Inventors: Hideo Sakata, Settsu (JP); Meiten Koh, Settsu (JP); Akiyoshi Yamauchi, Decatur, AL (US); Hitomi Nakazawa, Settsu (JP); Tomoyo Sanagi, Moriguchi (JP); Aoi Nakazono, Settsu (JP); Yuki Adachi, Settsu (JP); Kyouhei Sawaki, Settsu (JP); Akinori Tani, Settsu (JP); Masahiro Tomita, Settsu (JP); Michiru Kagawa, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 103 days.

This patent is subject to a terminal disclaimer.

(21) Appl. No.: 14/008,285

(22) PCT Filed: Mar. 29, 2012

(86) PCT No.: PCT/JP2012/058459
§ 371 (c)(1),
(2), (4) Date: Sep. 27, 2013

(87) PCT Pub. No.: WO2012/133698
PCT Pub. Date: Oct. 4, 2012

(65) Prior Publication Data
US 2014/0017560 A1    Jan. 16, 2014

(30) Foreign Application Priority Data

Mar. 31, 2011  (JP) ................................ 2011-080298

(51) Int. Cl.
| | | |
|---|---|---|
| *H01M 10/0564* | (2010.01) | |
| *H01M 10/0569* | (2010.01) | |
| *H01M 10/052* | (2010.01) | |
| *H01M 10/0567* | (2010.01) | |

(52) U.S. Cl.
CPC ..... *H01M 10/0564* (2013.01); *H01M 10/052* (2013.01); *H01M 10/0567* (2013.01); *H01M 10/0569* (2013.01); *H01M 2300/0028* (2013.01)

(58) Field of Classification Search
CPC ................................ H01G 11/54; H01G 11/60
See application file for complete search history.

(56) References Cited

U.S. PATENT DOCUMENTS

| | | |
|---|---|---|
| 5,754,393 A | 5/1998 | Hiratsuka et al. |
| 2004/0038133 A1 | 2/2004 | Yamaguchi et al. |
| 2007/0054186 A1 | 3/2007 | Costello et al. |
| 2010/0033899 A1 | 2/2010 | Koh et al. |
| 2011/0098511 A1 | 4/2011 | Kagawa et al. |
| 2011/0216477 A1 | 9/2011 | Takahashi et al. |
| 2012/0083629 A1 | 4/2012 | Kagawa et al. |
| 2012/0107701 A1 | 5/2012 | Iwaya |
| 2014/0029165 A1 | 1/2014 | Takahashi et al. |

FOREIGN PATENT DOCUMENTS

| | | |
|---|---|---|
| CN | 101578675 A | 11/2009 |
| EP | 1882680 A1 | 1/2008 |
| JP | 08-306591 A | 11/1996 |
| JP | 11-026015 A | 1/1999 |
| JP | 2000-208372 A | 7/2000 |
| JP | 2001-143750 A | 5/2001 |
| JP | 2002-201152 A | 7/2002 |
| JP | 3807459 B2 | 8/2006 |
| JP | 2009-508304 A | 2/2009 |
| JP | 2010-135431 A | 6/2010 |
| JP | 2010-146740 A | 7/2010 |
| JP | 2011-40311 A | 2/2011 |
| JP | 2012-74135 A | 4/2012 |

(Continued)

OTHER PUBLICATIONS

International Search Report for PCT Appln. No. PCT/JP2012/058474 dated Jun. 26, 2012.

(Continued)

*Primary Examiner* — Alix E Eggerding
(74) *Attorney, Agent, or Firm* — Sughrue Mion, PLLC

(57) ABSTRACT

The present invention provides a lithium ion secondary cell excellent in high-temperature storage characteristics and high voltage cycle characteristics; and a nonaqueous electrolyte for the cell.

The present invention relates to a lithium ion secondary cell, comprising a positive electrode, a negative electrode, and a nonaqueous electrolyte containing nonaqueous solvents and an electrolyte salt, the nonaqueous solvents comprising a fluorine-containing ether represented by the formula (1):

$$Rf^1\text{—}O\text{—}Rf^2 \quad (1)$$

wherein $Rf^1$ and $Rf^2$ are the same as or different from each other, each being a $C_{1\text{-}10}$ alkyl group or a $C_{1\text{-}10}$ fluoroalkyl group; and at least one of $Rf^1$ and $Rf^2$ is a fluoroalkyl group, and the following compounds (I) and (II): (I) a fluorine-containing unsaturated compound; and (II) a hydroxy group-containing compound represented by the formula (2):

$$Rf^1\text{OH} \quad (2)$$

wherein $Rf^1$ is the same as above, and the nonaqueous solvents comprising the compounds (I) and (II) in a total amount of 5000 ppm or less for the fluorine-containing ether.

5 Claims, No Drawings

(56) References Cited

FOREIGN PATENT DOCUMENTS

| | | |
|---|---|---|
| JP | 2012-074135 A | 4/2012 |
| KR | 1020040018096 A | 3/2004 |
| WO | 2008/078626 A1 | 7/2008 |
| WO | 2009154135 A1 | 12/2009 |
| WO | 2010055762 A1 | 5/2010 |
| WO | 2010/147105 A1 | 12/2010 |
| WO | 2011/001985 A1 | 1/2011 |

OTHER PUBLICATIONS

English Translation of International Preliminary Report on Patentability and Written Opinion of the International Searching Authority for PCT Appln. No. PCT/JP2012/058459 dated Oct. 8, 2013.
English Translation of International Preliminary Report on Patentability and Written Opinion of the International Searching Authority for PCT Appln. No. PCT/JP2012/058474 dated Oct. 8, 2013.
Communication dated Jul. 30, 2014, issued by the European Patent Office in corresponding Application No. 12765720.3.
International Search Report dated Jun. 12, 2012, issued by the International Searching Authority in corresponding International Application No. PCT/JP2012/058459.
Communication dated Nov. 27, 2014 from the European Patent Office in European Patent Application No. 12763500.1 (counterpart of related U.S. Appl. No. 14/008,466).
"1,1,2,2-Tetrafluoroethyl 2,2,3,3-tetrafluoropropyl ether"; SynQuest Labs, Inc., 2010, XP055424550, Retried from the Internet: URL:http://www.synquestlabs.com/product/id/22001.html.

LITHIUM ION SECONDARY BATTERY AND NONAQUEOUS ELECTROLYTE FOR LITHIUM ION SECONDARY BATTERY

CROSS REFERENCE TO RELATED APPLICATIONS

This application is a National Stage of International Application No. PCT/JP2012/058459, filed on Mar. 29, 2012, which claims priority from Japanese Patent Application No. 2011-080298, filed on Mar. 31, 2011, the contents of all of which are incorporated herein by reference in their entirety.

TECHNICAL FIELD

The present invention relates to a lithium ion secondary cell that includes a nonaqueous electrolyte containing nonaqueous solvents and an electrolyte salt, the nonaqueous solvents containing a reduced amount of a specific compound. The present invention also relates to a nonaqueous electrolyte for lithium ion secondary cells.

BACKGROUND ART

With recent reduction in the size and weight of electrical products, lithium ion secondary cells having high energy density have been developed. Also, with an expansion of the field of application of the lithium ion secondary cells, improved cell characteristics have come into demand. Especially, the safety and cell characteristics will become increasingly important in using lithium ion secondary cells in vehicles.

Lithium ion secondary cells are, however, insufficient in safety when they are overcharged, when they have an internal short circuit, or when they are penetrated by a nail. In the case of in-vehicle use, higher safety is required. Also, in the case of in-vehicle use, the voltage is required to be higher than that currently used to increase the capacity.

As a method for providing a nonaqueous electrolyte secondary cell with improved safety and a higher voltage, use of a fluorine-containing ether having a specific structure has been proposed (see Patent Literature 1, for example). The nonaqueous electrolyte secondary cell of Patent Literature 1, however, is disadvantageous in that the discharge capacity is reduced when it is left in a high temperature environment or when repeatedly charged and discharged.

CITATION LIST

Patent Literature

Patent Literature 1: Japanese Patent No. 3807459 Description

SUMMARY OF INVENTION

Technical Problem

The present invention aims to provide a lithium ion secondary cell excellent in high-temperature storage characteristics and high-voltage cycle characteristics. The present invention also aims to provide a nonaqueous electrolyte for the cell.

Solution to Problem

After various studies for solving the problem, the present inventors have found out that the problem can be solved by the use of nonaqueous solvents containing a reduced amount of specific impurities. Thereby, they completed the present invention.

Accordingly, the present invention relates to a lithium ion secondary cell, including a positive electrode, a negative electrode, and a nonaqueous electrolyte containing nonaqueous solvents and an electrolyte salt, the nonaqueous solvents including a fluorine-containing ether represented by the formula (1):

$$Rf^1—O—Rf^2 \quad (1)$$

wherein $Rf^1$ and $Rf^2$ are the same as or different from each other, each being a $C_{1-10}$ alkyl group or a $C_{1-10}$ fluoroalkyl group; and at least one of $Rf^1$ and $Rf^2$ is a fluoroalkyl group, the nonaqueous solvents containing the following compounds (I) and (II): (I) a fluorine-containing unsaturated compound and (II) a hydroxy group-containing compound represented by the formula (2):

$$Rf^1OH \quad (2)$$

wherein $Rf^1$ is the same as above, and
the total amount of the compounds (I) and (II) being 5000 ppm or less for the fluorine-containing ether.

Preferably, the fluorine-containing ether represented by the formula (1) is $HCF_2CF_2CH_2OCF_2CF_2H$, the fluorine-containing unsaturated compound (I) includes (I-1) $CF_2$=$CFCH_2OCF_2CF_2H$ and (I-2) $HCF_2CF$=$CHOCF_2CF_2H$, and the hydroxy group-containing compound (II) is (II-1) $HCF_2CF_2CH_2OH$.

Preferably, the fluorine-containing ether represented by the formula (1) is $HCF_2CF_2CH_2OCF_2CFHCF_3$, the fluorine-containing unsaturated compound (I) includes (I-3) $CF_2$=$CFCH_2OCF_2CFHCF_3$, (I-4) $HCF_2CF_2CH_2OCF$=$CFCF_3$, (I-5) $HCF_2CF_2CH_2OCF_2CF$=$CF_2$, and (I-6) $HCF_2CF$=$CHOCF_2CFHCF_3$, and the hydroxy group-containing compound (II) is (II-1) $HCF_2CF_2CH_2OH$.

The nonaqueous solvents preferably contain 0.01 to 90 wt % of the fluorine-containing ether represented by the formula (1)

The present invention also relates to a nonaqueous electrolyte for lithium ion secondary cells, including nonaqueous solvents and an electrolyte salt, the nonaqueous solvents including a fluorine-containing ether represented by the formula (1):

$$Rf^1—O—Rf^2 \quad (1)$$

wherein $Rf^1$ and $Rf^2$ are the same as or different from each other, each being a $C_{1-10}$ alkyl group or a $C_{1-10}$ fluoroalkyl group; and at least one of $Rf^1$ and $Rf^2$ is a fluoroalkyl group, the nonaqueous solvents containing the following compounds (I) and (II): (I) a fluorine-containing unsaturated compound and (II) a hydroxy group-containing compound represented by the formula (2):

$$Rf^1OH \quad (2)$$

wherein $Rf^1$ is the same as above, and the total amount of the compounds (I) and (II) being 5000 ppm or less for the fluorine-containing ether.

Advantageous Effect of Invention

The present invention can provide: a lithium ion secondary cell excellent in high-temperature storage characteristics and high-voltage cycle characteristics; and a nonaqueous electrolyte for the cell.

DESCRIPTION OF EMBODIMENT

The lithium ion secondary cell of the present invention includes a positive electrode, a negative electrode, and a nonaqueous electrolyte containing nonaqueous solvents and an electrolyte salt, the nonaqueous solvents including a fluorine-containing ether represented by the formula (1):

$$Rf^1—O—Rf^2 \qquad (1)$$

wherein $Rf^1$ and $Rf^2$ are the same as or different from each other, each being a $C_{1-10}$ alkyl group or a $C_{1-10}$ fluoroalkyl group; and at least one of $Rf^1$ and $Rf^2$ is a fluoroalkyl group, the nonaqueous solvents containing the following compounds (I) and (II): (I) a fluorine-containing unsaturated compound and (II) a hydroxy group-containing compound represented by the formula (2):

$$Rf^1OH \qquad (2)$$

wherein $Rf^1$ is the same as above, and the total amount of the compounds (I) and (II) being 5000 ppm or less for the fluorine-containing ether.

Specific examples of the fluorine-containing ether represented by the formula (1) include $HCF_2CF_2CH_2OCF_2CF_2H$, $CF_3CF_2CH_2OCF_2CF_2H$, $HCF_2CF_2CH_2OCF_2CFHCF_3$, $CF_3CF_2CH_2OCF_2CFHCF_3$, $C_6F_{13}OCH_3$, $C_6F_{13}OC_2H_5$, $C_8F_{17}OCH_3$, $C_8F_{17}OC_2H_5$, $CF_3CFHCF_2CH(CH_3)$ $OCF_2CFHCF_3$, $HCF_2CF_2OCH(C_2H_5)_2$, $HCF_2CF_2OC_4H_9$, $HCF_2CF_2OCH_2CH(C_2H_5)_2$, and $HCF_2CF_2OCH_2CH(CH_3)_2$. The fluorine-containing ether is preferably one or more compounds selected from the group consisting of $HCF_2CF_2CH_2OCF_2CF_2H$ and $HCF_2CF_2CH_2OCF_2CFHCF_3$, and is more preferably $HCF_2CF_2CH_2OCF_2CF_2H$ from the viewpoint of the oxidation resistance, the compatibility with electrolyte salts such as $LiPF_6$, and the safety.

The fluorine content of the fluorine-containing ether used in the present invention is preferably 50 wt % or more from the view point of favorable oxidation resistance and safety. The fluorine content is particularly preferably 55 to 66 wt %. The fluorine content is calculated using the structural formula.

The amount of the fluorine-containing ether represented by the formula (1) is preferably 0.01 to 90 wt % for the nonaqueous solvents. If the amount of the fluorine-containing ether is less than 0.01 wt %, the safety tends to be hardly improved, and the voltage tends to hardly increase. If the amount of the fluorine-containing ether is more than 90 wt %, the electrolyte tends to be separated into two phases or have too high a viscosity, resulting in deterioration in load characteristics at low temperatures. The lower limit of the amount is more preferably 0.1 wt %, and further preferably 0.5 wt %. The upper limit is more preferably 80 wt %, further preferably 60 wt %, and particularly preferably 20 wt %.

The fluorine-containing unsaturated compound (I) is derived from a by-product produced in synthesizing the fluorine-containing ether represented by formula (1). In particular, the compound (I) is formed by desorption of hydrogen fluoride (HF) from the fluorine-containing ether represented by the formula (1) accompanied by a formation of an unsaturated bond. More specific examples of the compound (I) include (I-1) $CF_2$=$CFCH_2OCF_2CF_2H$, (I-2) $HCF_2CF$=$CHOCF_2CF_2H$, (I-3) $CF_2$=$CFCH_2OCF_2CFHCF_3$, (I-4) $HCF_2CF_2CH_2OCF$=$CFCF_3$, (I-5) $HCF_2CF_2CH_2OCF_2CF$=$CF_2$, and (I-6) $HCF_2CF$=$CHOCF_2CFHCF_3$.

The hydroxy group-containing compound (II) is derived from a material used for synthesizing the fluorine-containing ether represented by the formula (1), and is represented by the formula (2):

$$Rf^1OH \qquad (2).$$

Here, $Rf^1$ may be the same as in the formula (1). Specific examples of the hydroxy group-containing compound (II) include (II-1) $HCF_2CF_2CH_2OH$.

In the present description, (I) fluorine-containing unsaturated compound, (II) hydroxy group-containing compound, and the specific compounds (I-1) to (I-6) and (II-1) are also simply referred to as compound (I), compound (II), and compounds (I-1) to (I-6) and compound (II-1), respectively.

In a preferred combination in the present invention, the compound (I) includes the compound (I-1) and the compound (I-2), and the compound (II) is the compound (II-1). In another preferred combination, the compound (I) includes the compound (I-3), the compound (I-4), the compound (I-5), and the compound (I-6), and the compound (II) is the compound (II-1).

As described above, the compounds (I) and (II) are impurities in the fluorine-containing ether. Therefore, by previously purifying the fluorine-containing ether to be used in the present invention, the amount of the compounds (I) and (II) in the nonaqueous solvents can be within the range described above (5000 ppm or less in total for the fluorine-containing ether). Here, ppm is by weight. An amount of 5000 ppm or less for the fluorine-containing ether equals 0.5 parts by weight or less for 100 parts by weight of the fluorine-containing ether.

If the total amount of the compounds (I) and (II) is more than 5000 ppm, the discharge characteristics after high-temperature storage may decrease, and the level of cycle degradation may be high when higher voltage is applied. Of the compounds (I) and (II), the hydroxy group-containing compound (II) is likely to react with Li. As a result, a residual hydroxy group-containing compound (II) tends to result in reduction in the capacity. Also, since having a double bond, the fluorine-containing unsaturated compound (I) readily reacts with water in the electrolyte to be decomposed, if remaining in a large amount.

The upper limit of the amount of the compounds (I) and (II) is preferably 3500 ppm for the fluorine-containing ether, and more preferably 2000 ppm. The lower limit of the total amount of the compounds (I) and (II) may be, for example, 100 ppm. The lower limit is preferably 300 ppm, and more preferably 500 ppm.

Further, the HOMO energies of the compounds (I) and (II), which are calculated using the molecular activation calculation, are higher than that of the fluorine-containing ether represented by the formula (1). These compounds are therefore poor in the oxidation resistance, and thereby decompose when higher voltage is applied. This is believed to be a degradation factor. For this reason, the high-temperature storage characteristics and the high-voltage cycle characteristics of the lithium ion secondary cell are believed to be less likely to decrease as the amount of the compounds (I) and (II) in the fluorine-containing ether is smaller.

Examples of the method for purifying the fluorine-containing ether represented by the formula (1) include rectification using a distillation column with five or more theoretical stages. In particular, for example, a fluorine-containing ether (hereinafter, it is also referred to as a fluorine-containing crude ether solution) containing impurities may be subjected to countercurrent extraction using water as an extracting solvent (separating medium) for the fluorine-containing alkyl alcohol.

The countercurrent extraction method is one of the liquid-liquid extraction methods, and uses a vertical extraction apparatus in extraction. In the method, a fluorine-containing crude ether solution with a high specific gravity (e.g. a specific gravity of about 1.5) is introduced from the top of the extractor, while water (a specific gravity of 1.0) is introduced from the bottom. Thereafter, optionally with stirring, drops of the water are raised to the upper part of the apparatus. During that movement, each drop of water is allowed to sufficiently contact with the fluorine-containing crude ether solution, thereby dissolving fluorine-containing alkyl alcohol for extraction. Water supplied for the extraction is withdrawn from the upper part of the apparatus.

Representative examples of the countercurrent extraction apparatus include a mixer-settler extractor with mixers arranged in multiple stages.

In the following, $HCF_2CF_2CH_2OCF_2CF_2H$ and $HCF_2CF_2CH_2OCF_2CFHCF_3$, which are more preferred examples of the fluorine-containing ether represented by the formula (1), are described.

$HCF_2CF_2CH_2OCF_2CF_2H$ is usually synthesized by reacting $HCF_2CF_2CH_2OH$ (compound (II-1)) with $CF_2=CF_2$. As a result, depending on the purification method, $HCF_2CF_2CH_2OH$ (compound (II-1)) that is a starting material, $CF_2=CFCH_2OCF_2CF_2H$ (compound (I-1)), $HCF_2CF=CHOCF_2CF_2H$ (compound (I-2)) that are by-products, and/or the like may remain.

$HCF_2CF_2CH_2OCF_2CFHCF_3$ is usually synthesized by reacting $HCF_2CF_2CH_2OH$ (compound (II-1)) with $CF_3CF=CF_2$. As a result, depending on the purification method, $HCF_2CF_2CH_2OH$ (compound (II-1)) that is a starting material, $CF_2=CFCH_2OCF_2CFHCF_3$ (compound (I-3)), $HCF_2CF_2CH_2OCF=CFCF_3$ (compound (I-4)), $HCF_2CF_2CH_2OCF_2CF=CF_2$ (compound (I-5)), $HCF_2CF=CHOCF_2CFHCF_3$ (compound (I-6)) that are by-products, and/or the like may remain.

Therefore, in a preferred combination in the case that the fluorine-containing ether represented by the formula (1) is $HCF_2CF_2OCH_2CF_2CF_2H$, the compound (I) includes the compound (I-1) and the compound (I-2), and the compound (II) is the compound (II-1). Also, in a preferred combination in the case that the fluorine-containing ether represented by the formula (1) is $HCF_2CF_2CH_2OCF_2CFHCF_3$, the compound (I) includes the compound (I-3), the compound (I-4), the compound (I-5), and the compound (I-6), and the compound (II) is the compound (II-1).

As other nonaqueous-solvent components to be used in the present invention, any conventionally known solvent for nonaqueous electrolyte secondary cells can be used. Examples thereof include: alkylene carbonates such as ethylene carbonate, propylene carbonate, and butylene carbonate; dialkyl carbonates (the alkyl group of the dialkyl carbonate is preferably a $C_{1-4}$ alkyl group) such as dimethyl carbonate, diethyl carbonate, di-n-propyl carbonate, and ethyl methyl carbonate; cyclic ethers such as tetrahydrofuran and 2-methyl tetrahydrofuran; chain ethers such as dimethoxyethane and dimethoxymethane; cyclic carboxylic acid ester compounds such as γ-butyrolactone and γ-valerolactone; and chain carboxylic acid ester compounds such as methyl acetate, methyl propionate, and ethyl propionate. Two or more of these may be used in combination.

Preferable examples of the nonaqueous solvent include one mainly made from an alkylene carbonate and a dialkyl carbonate. In particular, a mixed solvent containing 20 to 45 vol % of an alkylene carbonate having a $C_{2-4}$ alkylene group and 55 to 80 vol % of a dialkylcarbonate with a $C_{1-4}$ alkyl group is preferred because it results in an electrolyte having high electrical conductivity, high cycle characteristics, and high large current discharge characteristics.

Examples of the alkylene carbonate with a $C_{2-4}$ alkylene group include ethylene carbonate, propylene carbonate, and butylene carbonate. Preferred among these are ethylene carbonate and propylene carbonate.

Examples of the dialkyl carbonate with $C_{1-4}$ alkyl group include dimethyl carbonate, diethyl carbonate, di-n-propyl carbonate, ethyl methyl carbonate, methyl-n-propyl carbonate, and ethyl-n-propyl carbonate. Preferred among these are dimethyl carbonate, diethyl carbonate, and ethyl methyl carbonate.

Preferable examples of the nonaqueous solvent also include one containing at least one organic solvent selected from the group consisting of ethylene carbonate, propylene carbonate, γ-butyrolactone, and γ-valerolactone. The total amount of these organic solvents is preferably 60 vol % or more, and more preferably 85 vol % or more. An electrolyte obtained by dissolving a lithium salt in the nonaqueous solvent causes less evaporation of the solvent and less liquid spill even when used at high temperatures. A mixture of 5 to 45 vol % of ethylene carbonate and 55 to 95 vol % of γ-butyrolactone and a solvent containing 30 to 60 vol % of ethylene carbonate and 40 to 70 vol % of propylene carbonate are especially preferred because these have a favorable balance between the cycle characteristics and the large current discharge characteristics.

Preferable examples of the nonaqueous solvent further include one containing a phosphorus-containing organic solvent. Examples of the phosphorus-containing organic solvent include trimethyl phosphate, triethyl phosphate, dimethyl ethyl phosphate, methyl diethyl phosphate, ethylene methyl phosphate, and ethylene ethyl phosphate. A nonaqueous solvent containing such a phosphorous-containing organic solvent in an amount of 10 vol % or more can reduce the combustibility of the electrolyte. Especially, the electrolyte is preferably prepared by dissolving a lithium salt in a nonaqueous solvent containing 10 to 80 vol % of the phosphorous-containing organic solvent and the other component (s) including mainly at least one organic solvent selected from the group consisting of γ-butyrolactone, γ-valerolactone, alkylene carbonates and dialkyl carbonates. This is because such an electrolyte has a favorable balance between the cycle characteristics and the large current discharge characteristics.

Further, the nonaqueous solvent preferably contains 8 wt % or less of, and more preferably 0.01 to 8 wt % of a cyclic carbnate having a carbon-carbon unsaturated bond in each molecule. When the amount of the cyclic carbonic acid ester is within the range, a side reaction of the fluorine-containing ether represented by the formula (1) on the negative electrode can advantageously be suppressed, further improving the storage characteristics and the cycle characteristics of the cell. If the amount of the cyclic carbonic acid ester is more than 8 wt %, the cell properties after storage may be decreased, or the inner pressure of the cell tends to be increased by gas evolution. The lower limit of the amount is more preferably 0.1 wt %, and the upper limit is more preferably 3 wt %.

Examples of the cyclic carbonic acid ester having a carbon-carbon unsaturated bond in each molecule include vinylene carbonate compounds such as vinylene carbonate, methyl vinylene carbonate, ethyl vinylene carbonate, 4,5-dimethyl vinylene carbonate, 4,5-diethyl vinylene carbonate, fluorovinylene carbonate, and trifluoromethyl vinylene carbonate; and vinyl ethylene carbonate compounds such as 4-vinyl ethylene carbonate, 4-methyl-4-vinyl ethylene carbonate, 4-ethyl-4-vinyl ethylene carbonate, 4-n-propyl-4-vinyl ethylene carbonate, 5-methyl-4-vinyl ethylene carbonate, 4,4-divinyl ethylene carbonate, 4,5-divinyl ethylene carbonate, 4,4-dimethyl-5-methylene ethylene carbonate, and 4,4-diethyl-5-methylene ethylene carbonate. Preferred among these are vinylene carbonate, 4-vinyl ethylene carbonate, 4-methyl-4-vinyl ethylene carbonate, and 4,5-divinyl ethylene carbonate, and especially preferred are vinylene carbonate and 4-vinyl ethylene carbonate. Two or more of these may be used in combination.

Further, the nonaqueous solvent may contain, if necessary, other useful compounds such as conventionally known additives, a dehydrating agent, a deoxidizing agent, or an overcharge inhibitor.

Examples of the additive include carbonate compounds such as fluoroethylene carbonate, trifluoropropylene carbonate, phenyl ethylene carbonate, and erythritan carbonate; carboxylic anhydrides such as succinic anhydride, glutaric anhydride, maleic anhydride, citraconic anhydride, glutaconic anhydride, itaconic anhydride, diglycolic anhydride, cyclohexane dicarboxylic anhydride, cyclopentane tetracarboxylic dianhydride, and phenyl succinic anhydride; sulfur-containing compounds such as ethylene sulfite, 1,3-propanesultone, 1,4-butanesultone, methyl methane sulfonate, busulfan, sulfolane, sulfolene, dimethyl sulfone, and tetramethylthiuram monosulfide; nitrogen-containing compounds such as 1-methyl-2-pyrrolidinone, 1-methyl-2-piperidone, 3-methyl-2-oxazolidinone, 1,3-dimethyl-2-imidazolidinone, and N-methyl succinimide; and hydrocarbon compounds such as heptane, octane, cycloheptane, and fluorobenzene. If the nonaqueous solvent contains 0.1 to 5 wt % of these additives, the capacitance retention characteristics after high-temperature storage and the cycle characteristics are favorable.

Examples of the overcharge inhibitor include aromatic compounds such as cyclohexylbenzene, biphenyl, alkyl biphenyl, terphenyl, partial hydroxides of terphenyl, t-butyl benzene, t-amyl benzene, diphenyl ether, benzofuran, and dibenzofuran; partial fluorinated compounds of the aromatic compounds such as 2-fluorobiphenyl; and fluorine-containing anisole compounds such as 2,4-difluoroanisole, 2,5-difluoroanisole, and 2,6-difluoroanisole. If the nonaqueous solvent contains 0.1 to 5 wt % of these overcharge inhibitors, bursting and/or ignition of the cell can be prevented when the cell is overcharged.

Any electrolyte salt can be used as the electrolyte salt of the present invention, but lithium salts are preferable. Examples of the lithium salt include inorganic lithium salts such as $LiClO_4$, $LiPF_6$, and $LiBF_4$; fluorine-containing organic lithium salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, and $LiBF_2(C_2F_5SO_2)_2$. Each of these can be used alone, or two or more of these can be used in combination. Preferred among these are $LiPF_6$, $LiBF_4$, $LiCF_3SO_3$, $LiN(CF_3SO_2)_2$, and $LiN(C_2F_5SO_2)_2$, and especially preferred are $LiPF_6$ and $LiBF_4$. In addition, a combination use of an inorganic lithium salt such as $LiPF_6$ and $LiBF_4$ and a fluorine-containing organic lithium salt such as $LiCF_3SO_3$, $LiN(CF_3SO_2)_2$, and $LiN(C_2F_5SO_2)_2$ advantageously reduces degradation after high-temperature storage.

Here, if the nonaqueous solvent contains 55 vol % or more of γ-butyrolactone, 50 wt % or more of the total of the lithium salts is preferably $LiBF_4$. Particularly preferably, 50 to 95 wt % of the lithium salts is $LiBF_4$, and 5 to 50 wt % is a lithium salt selected from the group consisting of $LiPF_6$, $LiCF_3SO_3$, $LiN(CF_3SO_2)_2$, and $LiN(C_2F_6SO_2)$.

The concentration of the electrolyte salt in the electrolyte is preferably 0.5 to 3 mol/liter. If the concentration is out of this range, the electrical conductivity of the electrolyte tends to be reduced, decreasing the battery performance.

Examples of the material of the negative electrode in the cell of the present invention include carbonaceous materials capable of absorbing and emitting lithium such as pyrolysates of organic substances obtainable under various pyrolysis conditions, artificial graphites, and natural graphites; metallic oxide materials capable of absorbing and emitting lithium such as tin oxide and silicon oxide; lithium metals; and various lithium alloys. Two or more of these negative electrode materials can be used in combination.

The carbonaceous material capable of absorbing and emitting lithium is preferably an artificial graphite or purified natural graphite produced by a high-temperature treatment of a graphitizable pitch obtained from various materials. The carbonaceous material is also preferably a product obtained by carbonizing these graphites after a surface treatment using pitch and other organic substances.

A conventional method can be used for producing the negative electrode. Examples of the method include a method including adding a binder, a thickener, a conductive material, and/or solvents to a negative electrode material to provide a slurry; applying the slurry to a current collector; drying the coating; and then pressing the coated current collector to increase the density.

The binder may be any binder as long as it is safe for the solvent, electrolyte, and the like to be used in producing the electrode. Examples thereof include polyvinylidene fluoride, polytetrafluoroethylene, polyethylene, polypropylene, styrene-butadiene rubber, isoprene rubber, butadiene rubber, ethylene-acrylic acid copolymers, and ethylene-methacrylic acid copolymers.

Examples of the thickener include carboxymethylcellulose, methylcellulose, hydroxymethylcellulose, ethylcellulose, polyvinyl alcohol, oxidized starch, phosphorylated starch, and casein.

Examples of the conductive material include metallic materials such as copper and nickel; and carbon materials such as graphites and carbon black.

Examples of the material of the current collector for negative electrodes include copper, nickel, and stainless steel. Preferred among these is copper foil as it is easy to process into a thin film and the cost is low.

The material of the positive electrode in the cell is particularly preferably a lithium-containing transition metal complex oxide that provides high voltage. Preferable example thereof include lithium-manganese spinel complex oxides represented by the formula (1): $Li_aMn_{2-b}M^1_bO_4$ (wherein, 0.9≤a; 0≤b≤1.5; and $M^1$ is at least one metal selected from the group consisting of Fe, Co, Ni, Cu, Zn, Al, Sn, Cr, V, Ti, Mg, Ca, Sr, B, Ga, In, Si, and Ge), lithium-nickel complex oxides represented by the formula (2): $LiNi_{1-c}M^2_cO_2$ (wherein, 0≤c≤0.5; and $M^2$ is at least one metal selected from the group consisting of Fe, Co, Mn, Cu, Zn, Al, Sn, Cr, V, Ti, Mg, Ca, Sr, B, Ga, In, Si, and Ge), and lithium-cobalt complex oxides represented by $LiCo_{1-d}M^3_dO_2$ (wherein, 0≤d≤0.5; $M^3$ is at least one metal selected from the group consisting of Fe, Ni, Mn, Cu, Zn, Al, Sn, Cr, V, Ti, Mg, Ca, Sr, B, Ga, In, Si, and Ge).

In particular, $LiCoO_2$, $LiMnO_2$, $LiNiO_2$, $LiMn_2O_4$, $LiNi_{0.8}Co_{0.15}Al_{0.05}O_2$, and $LiNi_{1/3}Co_{1/3}Mn_{1/3}O_2$ are preferred because these have high energy density and can provide a high-output lithium ion secondary cell.

Also, positive electrode active materials such as $LiFePO_4$, $LiNi_{0.8}Co_{0.2}O_2$, $Li_{1.2}Fe_{0.4}Mn_{0.4}O_2$, $LiNi_{0.5}Mn_{0.5}O_2$, and $LiV_3O_6$ may be used.

The amount of the positive electrode active material is preferably 50 to 99% by mass, and more preferably 80 to 99% by mass of the positive electrode mixture from the viewpoint of a large cell capacity.

Especially when the cell of the present invention is used as a large lithium ion secondary cell for hybrid automobiles, dispersed power sources, or the like, a high output power is required. Therefore, the particles of the positive electrode active material preferably mainly include secondary particles having an average particle size of preferably 40 μm or less, and preferably also include 0.5 to 7.0 vol % of fine particles having an average primary particle size of 1 μm or less. If the particles include fine particles having an average particle size of 1 μm or less, the contact area with electrolyte is large, which allows lithium ions diffuse more rapidly between the electrode and the electrolyte, leading to improved output performance.

The binder for the positive electrode may be the same as for the negative electrode. Any binder can be used as long as it is safe for the solvents, electrolyte, and the like to be used in producing the electrode. Examples thereof include polyvinylidene fluoride, polytetrafluoroethylene, polyethylene, polypropylene, styrene-butadiene rubber, isoprene rubber, butadiene rubber, ethylene-acrylic acid copolymers, and ethylene-methacrylic acid copolymers.

Also, the thickener for the positive electrode may be the same as for the negative electrode. Examples thereof include carboxymethylcellulose, methylcellulose, hydroxymethylcellulose, ethylcellulose, polyvinyl alcohol, oxidized starch, phosphorylated starch, and casein.

Examples of the conductive material include carbon materials such as graphites and carbon black.

Examples of the material of the current collector for the positive electrode include metals such as aluminum, titanium, tantalum, and alloys thereof. Preferred among these are aluminum and alloys thereof.

The material and shape of a separator of the lithium ion secondary cell of the present invention are not limited as long as they are stable in the electrolyte and excellent in solution retention properties. Preferred examples thereof include porous sheets and nonwoven fabric made of a polyolefin such as polyethylene and polypropylene.

The cell may have any shape. For example, the cell may have a cylindrical, a square, a laminate, or a coin shape. Also, the cell may be large-size. Here, the shape and the structure of the positive electrode, the negative electrode, and the separator may be changed depending on the shape of the cell.

The present invention also includes a nonaqueous electrolyte for lithium ion secondary cells, including nonaqueous solvents and an electrolyte salt, the nonaqueous solvents including a fluorine-containing ether represented by the formula (1):

wherein $Rf^1$ and $Rf^2$ are the same as or different from each other, each being a $C_{1-10}$ alkyl group or a $C_{1-10}$ fluoroalkyl group; and at least one of $Rf^1$ and $Rf^2$ is a fluoroalkyl group, the nonaqueous solvents containing the following compounds (I) and (II): (I) a fluorine-containing unsaturated compound and (II) a hydroxy group-containing compound represented by the formula (2):

wherein $Rf^1$ is the same as above, and the total amount of the compounds (I) and (II) being 5000 ppm or less for the fluorine-containing ether.

The nonaqueous solvent and the electrolyte salt to be used for the nonaqueous electrolyte for lithium ion secondary cells of the present invention and the amounts thereof are the same as above.

EXAMPLES

In the following, the present invention is described based on, but not limited to, examples and comparative examples.

Measurement methods used for the present invention are as follows.

(1) Composition Analysis
NMR: AC-300 manufactured by Bruker Japan Co., Ltd was used.
$^{19}F$-NMR:
Measurement conditions: 282 MHz (trichlorofluoromethane=0 ppm)
$^1H$-NMR:
Measurement conditions: 300 MHz (tetramethylsilane=0 ppm)
(2) Concentration (GC %) Analysis
Gas chromatography (GC): GC-17A manufactured by Shimadzu Corp. was used.
Column: DB624 (Length 60 m, I.D. 0.32 mm, Film 1.8 μm)
Measurement limit: 0.001%

Synthesis Example 1

Synthesis of $HCF_2CF_2CH_2OCF_2CF_2H$

A vacuum is applied to the interior of a 6-L stainless steel autoclave system before 401 g (7.15 mol) of potassium hydroxide, 1604 mL of water, and 1716 g (13 mol) of 2,2,3,3-tetrafluoro-1-propanol ($HCF_2CF_2CH_2OH$) (Boiling point 109° C., specific gravity 1.4) as a fluorine-containing alkyl alcohol were introduced into the system. Thereafter, vacuum-nitrogen replacement was performed 20 times at room temperature. After the application of a vacuum to the interior of the system, the system was filled with tetrafluoroethylene (TFE) such that 0.1 MPa was achieved, and was heated such that the temperature in the reaction system was 85° C. After the temperature in the system reached 85° C., TFE in small portions was added to the system to maintain the reaction pressure in the range from 0.5 to 0.8 MPa. The temperature in the system was maintained at 75 to 95° C.

The TFE supply was stopped when the amount of TFE added reached 0.5 mol based on 1 mol of the fluorine-containing alkyl alcohol. The reaction was continued with stirring. When the pressure in the autoclave stopped dropping, the temperature in the autoclave was allowed to return to room temperature. Thereafter, the unreacted TFE was eliminated, and thereby the reaction was terminated. The time required was 5 hours.

The fluorine-containing ether in the lower phase of the resulting mixture was $HCF_2CF_2CH_2OCF_2CF_2H$ (boiling point 92° C., specific gravity 1.52). Analysis using GC showed that the lower phase, which is a fluorine-containing ether mixture, contained the fluorine-containing ether in a concentration of 98.7%, the compound (II-1) $HCF_2CF_2CH_2OH$ in a concentration of 1.02%, the compound (I-1) $CF_2=CFCH_2OCF_2CF_2H$ in a concentration of 0.05%, and the compound (I-2) $HCF_2CF=CHOCF_2CF_2H$ in a concentration of 0.23%.

The fluorine-containing ether mixture (1500 g) obtained in Synthesis Example 1, as a fluorine-containing crude ether solution 1, was subjected to countercurrent extraction using a mixer-settler extractor under the following conditions.
Mixer-settler extractor: (column height 3300 mm, inner diameter 200 mm)
Number of stages: 24 stages
Stirring rate: 285 rpm
Heavy liquid supply rate: 160 kg/hr
Light liquid: pure water
Light liquid supply rate: 100 kg/hr
Process temperature: 27° C.
Processing time: 0.01 hours The first drops, which are about 5% of the rectified solution, were disposed, and almost equivalent amounts of rectified solutions were sampled in the distillation order. Thereby, rectified solutions A, B and C of the fluorine-containing ether ($HCF_2CF_2CH_2OCF_2CF_2H$) having different amounts of the compounds (I-1), (I-2), and (II-1) were obtained.

TABLE 1

| | Purity (%) | Amount (ppm) | | | Total amount of compounds (I-1), (I-2), and (II-1) (ppm) |
| --- | --- | --- | --- | --- | --- |
| | | Compound (I-1) | Compound (I-2) | Compound (II-1) | |
| Fluorine-containing crude ether solution 1 | 98.70 | 500 | 2300 | 10200 | 13000 |
| Rectified solution A | 99.25 | 400 | 2400 | 4600 | 7400 |
| Rectified solution B | 99.50 | 200 | 2200 | 2600 | 5000 |
| Rectified solution C | 99.80 | 80 | 1900 | 10 | 1990 |

Synthesis Example 2

Synthesis of $HCF_2CF_2CH_2OCF_2CFHCF_3$

A vacuum is applied to the interior of a 3-L stainless steel autoclave system before 84 g (1.35 mol) of potassium hydroxide, 800 mL of water, and 600 g (4.5 mol) of 2,2,3,3-tetrafluoro-1-propanol ($HCF_2CF_2CH_2OH$) (boiling point 109° C., specific gravity 1.4) as a fluorine-containing alkyl alcohol were introduced into the system. Thereafter, vacuum-nitrogen replacement was performed 20 times at room temperature. After the application of a vacuum to the interior of the system, the system was filled with 681 g (4.5 mol) of hexafluoropropene ($CF_2=CFCF_3$) such that 0.1 MPa was achieved, and was heated such that the temperature in the reaction system was 85° C. After the temperature in the system reached 85° C., $CF_2=CFCF_3$ in small portions was added to the system to maintain the reaction pressure in the range from 0.5 to 0.8 MPa. The temperature in the system was maintained at 91 to 111° C.

The supply of $CF_2=CFCF_3$ was stopped when the amount of $CF_2=CFCF_3$ added reached 0.5 mol based on 1 mol of the fluorine-containing alkyl alcohol. The reaction was continued with stirring. After the pressure in the autoclave stopped dropping, the temperature in the autoclave was allowed to return to room temperature. Thereafter, the unreacted $CF_2=CFCF_3$ was eliminated, and thereby the reaction was terminated. The time required was 6 hours.

The fluorine-containing ether in the lower phase of the resulting mixture was $HCF_2CF_2CH_2OCF_2CFHCF_3$ (boiling point 108° C., specific gravity 1.61). Analysis using GC showed that the lower phase, which is a fluorine-containing ether mixture, contained the fluorine-containing ether in a concentration of 98.4%, the compound (II-1) $HCF_2CF_2CH_2OH$ in a concentration of 0.92%, the compound (I-3) $CF_2=CFCH_2OCF_2CFHCF_3$ in a concentration of 0.05%, the compound (I-4) $HCF_2CF_2CH_2OCF=CFCF_3$ in a concentration of 0.24%, the compound (I-5) $HCF_2CF_2CH_2OCF_2CF=CF_2$ in a concentration of 0.27%, and the compound (I-6) $HCF_2CF=CHOCF_2CFHCF_3$ in a concentration of 0.12%.

The fluorine-containing ether mixture (725 g) obtained in Synthesis Example 2 as a fluorine-containing crude ether solution 2 was subjected to countercurrent extraction using a mixer-settler extractor under the following conditions.
Mixer-settler extractor: (column height 3300 mm, inner diameter 200 mm)
Number of stages: 24 stages
Stirring rate: 285 rpm
Heavy liquid supply rate: 160 kg/hr
Light liquid: Pure water
Light liquid supply rate: 100 kg/hr
Process temperature: 27° C.
Processing time: 0.01 hours The first drops, which are about 5% of the rectified solution, were disposed, and almost equivalent amounts of rectified solutions were sampled in the distillation order. Thereby, rectified solutions D, E, and F of the fluorine-containing ether ($HCF_2CF_2CH_2OCF_2CFHCF_3$) having different amounts of the compounds (I-3), (I-4), (I-5), (I-6), and (II-1) were obtained.

TABLE 2

| | Purity (%) | Amount (ppm) | | | | | Total amount of compounds (I-3) to (I-6), and (II-1) (ppm) |
| --- | --- | --- | --- | --- | --- | --- | --- |
| | | Compound (I-3) | Compound (I-4) | Compound (I-5) | Compound (I-6) | Compound (II-1) | |
| Fluorine-containing crude ether solution 2 | 98.40 | 500 | 2400 | 2700 | 1200 | 9200 | 16000 |
| Rectified solution D | 99.20 | 300 | 2100 | 900 | 700 | 4000 | 8000 |
| Rectified solution E | 99.60 | 200 | 1200 | 700 | 300 | 1600 | 4000 |
| Rectified solution F | 99.95 | 80 | 300 | 30 | 10 | 80 | 500 |

Example 1

Under a dry argon atmosphere, 3 parts by weight of the rectified solution C of $HCF_2CF_2CH_2OCF_2CF_2H$ was added to 97 parts by weight of a mixture of ethylene carbonate and ethyl methyl carbonate (volume ratio 3:7). Subsequently, sufficiently dried $LiPF_6$ was dissolved in the resulting mixture at a ratio of 1 mol/liter to provide an electrolyte.

(Preparation of Coin Cell)

A positive electrode active material prepared by mixing $LiNi_{1/3}Mn_{1/3}Co_{1/3}O_2$, carbon black, and polyvinylidene fluoride (trade name: KF-7200, manufactured by Kureha Corporation) in 92/3/5 (in mass %) were dispersed in N-methyl-2-pyrolidone to provide a positive electrode mixture slurry. The resulting positive electrode mixture slurry was uniformly applied to an aluminum current collector, and was dried to form a positive electrode mixture layer (thickness 50 μm). Thereafter, the current collector with the layer was subjected to compression molding using a roller press machine to provide a positive electrode laminate. A circular positive electrode having a diameter of 1.6 mm was then punched out of the positive electrode laminate using a punching machine.

In addition, 6% by mass (in solid content) of styrene-butadiene rubber dispersed in distilled water was added to artificial graphite powder, and the resultant mixture was mixed using a disperser to provide a slurry. The slurry was uniformly applied to a negative electrode current collector (a copper foil having a thickness of 10 μm) and dried to provide a negative electrode mixture layer. Thereafter, the current collector with the layer was subjected to compression molding using a roller press machine. A negative electrode having a diameter of 1.6 mm was then punched out of the positive electrode laminate using a punching machine.

The positive electrode and the negative electrode were allowed to face each other with a microporous polyethylene film (separator) having a thickness of 20 μm therebetween. The electrolyte was injected to the resultant assembly and was allowed to sufficiently permeate the separator and the like. Thereafter, the assembly was sealed, precharged, and aged. Thereby, a coin lithium ion secondary cell was prepared.

(Measurement of Cell Characteristics)

The high-voltage cycle characteristics and high-temperature storage characteristics of the coin lithium ion secondary cell were measured using the following methods.

Charge and Discharge Conditions

Charge: Maintain 0.5 C and 4.3 V until the charge current reaches 1/10 C (CC/CV charge)

Discharge: 0.5 C, with 3.0 V cut-off (CC discharge)

(High-Voltage Cycle Characteristics)

To determine the cycle characteristics, a charge and discharge cycle under the above charge and discharge conditions (charging at 1.0 C and the predetermined voltage until the charge current reaches 1/10 C, and discharging at a current of 1 C to 3.0 V) was taken as 1 cycle. The discharge capacity after the 5 cycles and the discharge capacity after 100 cycles were measured. The cycle characteristics are represented by a capacitance retention calculated from the following formula. Table 3 shows the results.

$$\text{Capacity retention}(\%) = \frac{100 - \text{cycle discharge capacity(mAh)}}{5 - \text{cycle discharge capacity(mAh)}} \times 100 \quad [\text{Math 1}]$$

(High-Temperature Storage Characteristics)

To determine the high-temperature storage characteristics, the cell was charged and discharged under the above charge and discharge conditions (charging at 1.0 C and the predetermined voltage until the charge current reaches 1/10 C, and discharging at a current of 1 C to 3.0 V). Thereby, the discharge capacity was measured. Then, the cell was charged again under the above charge condition, and stored in an 85° C. constant temperature bath for one day. The cell after the storage was discharged under the above discharge condition to a discharge cut-off voltage of 3 V to measure the remaining capacity. The cell was charged again under the above charge condition, and then discharged at the constant current specified in the above discharge condition to a discharge cut-off voltage of 3 V to measure the recovery capacity. Table 3 shows the recovery capacity when the discharge capacity before the storage is taken as 100.

Example 2

A cell was prepared and tested in the same manner as in Example 1 except that the rectified solution C of $HCF_2CF_2CH_2OCF_2CF_2H$ was changed to the rectified solution B of $HCF_2CF_2CH_2OCF_2CF_2H$.

Example 3

A cell was prepared and tested in the same manner as in Example 1 except that the rectified solution C of $HCF_2CF_2CH_2OCF_2CF_2H$ was changed to the rectification F of $HCF_2CF_2CH_2OCF_2CFHCF_3$.

Example 4

A cell was prepared and tested in the same manner as in Example 1 except that the rectified solution C of $HCF_2CF_2CH_2OCF_2CF_2H$ was changed to the rectified solution E of $HCF_2CF_2CH_2OCF_2CFHCF_3$.

Comparative Example 1

A cell was prepared and tested in the same manner as in Example 1 except that the rectified solution C of $HCF_2CF_2CH_2OCF_2CF_2H$ was changed to the fluorine-containing crude ether solution 1.

Comparative Example 2

A cell was prepared and tested in the same manner as in Example 1 except that the rectified solution C of $HCF_2CF_2CH_2OCF_2CF_2H$ was changed to the rectified solution A of $HCF_2CF_2CH_2OCF_2CF_2H$.

Comparative Example 3

A cell was prepared and tested in the same manner as in Example 1 except that 7000 ppm of the compound (I-1) was added to the rectified solution C of $HCF_2CF_2CH_2OCF_2CF_2H$.

Comparative Example 4

A cell was prepared and tested in the same manner as in Example 1 except that 7000 ppm of the compound (II-1) was added to the rectified solution C of $HCF_2CF_2CH_2OCF_2CF_2H$.

Comparative Example 5

A cell was prepared and tested in the same manner as in Example 1 except that the rectified solution C of $HCF_2CF_2CH_2OCF_2CF_2H$ was changed to the fluorine-containing crude ether solution 2.

Comparative Example 6

A cell was prepared and tested in the same manner as in Example 1 except that the rectified solution C of $HCF_2CF_2CH_2OCF_2CF_2H$ was changed to the rectified solution D of $HCF_2CF_2CH_2OCF_2CFHCF_3$.

Comparative Example 7

A cell was prepared and tested in the same manner as in Example 1, except that the rectified solution C of $HCF_2CF_2CH_2OCF_2CF_2H$ was changed to a mixture of 7000 ppm of the compound (I-3) and the rectified solution F of $HCF_2CF_2CH_2OCF_2CFHCF_3$.

Comparative Example 8

A cell was prepared and tested in the same manner as in Example 1, except that the rectified solution C of $HCF_2CF_2CH_2OCF_2CF_2H$ was changed to a mixture of 7000 ppm of the compound (I-4) and the rectified solution F of $HCF_2CF_2CH_2OCF_2CFHCF_3$.

Comparative Example 9

A cell was prepared and tested in the same manner as in Example 1, except that the rectified solution C of $HCF_2CF_2CH_2OCF_2CF_2H$ was changed to a mixture of 7000 ppm of the compound (I-5) and the rectified solution F of $HCF_2CF_2CH_2OCF_2CFHCF_3$.

Comparative Example 10

A cell was prepared and tested in the same manner as in Example 1 except that the rectified solution C of $HCF_2CF_2CH_2OCF_2CF_2H$ was changed to a mixture of 7000 ppm of the compound (I-6) and the rectified solution F of $HCF_2CF_2CH_2OCF_2CFHCF_3$.

TABLE 3

| | High-voltage cycle characteristics Capacitance retention (%) | High-temperature storage characteristics Recovery capacity |
|---|---|---|
| Example 1 | 96.4 | 86.8 |
| Example 2 | 95.3 | 85.2 |
| Example 3 | 95.2 | 86.1 |
| Example 4 | 93.6 | 83.7 |
| Comparative Example 1 | 83.5 | 72.5 |
| Comparative Example 2 | 86.5 | 75.5 |
| Comparative Example 3 | 87.3 | 76.8 |
| Comparative Example 4 | 85.4 | 75.3 |
| Comparative Example 5 | 82.1 | 70.5 |
| Comparative Example 6 | 85.6 | 73.8 |
| Comparative Example 7 | 84.8 | 71.8 |
| Comparative Example 8 | 83.6 | 71.5 |
| Comparative Example 9 | 84.0 | 72.3 |
| Comparative Example 10 | 83.7 | 73.2 |

Table 3 indicates that if the total amount of the compounds (I-1), (I-2), and (II-1) in the rectified solution of $HCF_2CF_2CH_2OCF_2CF_2H$ is 5000 ppm or less for $HCF_2CF_2CH_2OCF_2CF_2H$, the high-temperature storage characteristics and the high-voltage cycle characteristics are improved. Also, Table 3 indicates that if the total amount of the compounds (I-3) to (I-6) and (II-1) in the rectified solution of $HCF_2CF_2CH_2OCF_2CFHCF_3$ is 5000 ppm or less for $HCF_2CF_2CH_2OCF_2CFHCF_3$, the high-temperature storage characteristics and the high-voltage cycle characteristics are improved.

The invention claimed is:

1. A lithium ion secondary cell, comprising:
a positive electrode;
a negative electrode; and
a nonaqueous electrolyte containing nonaqueous solvents and an electrolyte salt,
the nonaqueous solvents comprising
a fluorine-containing ether represented by the formula (1):

$$Rf^1\text{—}O\text{—}Rf^2 \quad (1)$$

wherein $Rf^1$ and $Rf^2$ are the same as or different from each other, each being a $C_{1-10}$alkyl group or a $C_{1-10}$ fluoroalkyl group; and at least one of $Rf^1$ and $Rf^2$ is a fluoroalkyl group,
the nonaqueous solvents containing the following compounds (I) and (II):
(I) a fluorine-containing unsaturated compound; and
(II) a hydroxy group-containing compound represented by the formula (2):

$$Rf^1OH \quad (2)$$

wherein $Rf^1$ is the same as above, and
the amount of compound (I) being 1980 ppm or less, the amount of compound (II) being 80 ppm or less, and the total amount of the compounds (I) and (II) being 2000 ppm or less for based on the amount of the fluorine-containing ether.

2. The lithium ion secondary cell according to claim 1, wherein
the fluorine-containing ether represented by the formula (1) is $HCF_2CF_2CH_2OCF_2CF_2H$,
the fluorine-containing unsaturated compound (I) comprises $CF_2=CFCH_2OCF_2CF_2H$ and (I-1)

$HCF_2CF=CHOCF_2CF_2H$, and (I-2)

the hydroxy group-containing compound (II) is $HCF_2CF_2CH_2OH$. (II-1)

3. The lithium ion secondary cell according to claim 1, wherein
the fluorine-containing ether represented by the formula (1) is $HCF_2CF_2CH_2OCF_2CFHCF_3$, the fluorine-containing unsaturated compound (I) comprises $CF_2=CFCH_2OCF_2CFHCF_3$, (I-3)

$HCF_2CF_2CH_2OCF=CFCF_3$, (I-4)

$HCF_2CF_2CH_2OCF_2CF=CF_2$, and (I-5)

$HCF_2CF=CHOCF_2CFHCF_3$, and (I-6)

the hydroxy group-containing compound (II) is $HCF_2CF_2CH_2OH$. (II-1)

4. The lithium ion secondary cell according to claim 1, wherein the nonaqueous solvents containing 0.01 to 90 wt % of the fluorine-containing ether represented by the formula (1).

5. A nonaqueous electrolyte for lithium ion secondary cells, comprising:
nonaqueous solvents; and
an electrolyte salt,
the nonaqueous solvents comprising:
a fluorine-containing ether represented by the formula (1):

$Rf^1—O—Rf^2$ (1)

wherein $Rf^1$ and $Rf^2$ are the same as or different from each other, each being a $C_{1-10}$ alkyl group or a $C_{1-10}$ fluoroalkyl group; and at least one of $Rf^1$ and $Rf^2$ is a fluoroalkyl group,
the nonaqueous solvents containing the following compounds (I) and (II):
(I) a fluorine-containing unsaturated compound; and
(II) a hydroxy group-containing compound represented by the formula (2):

$Rf^1OH$ (2)

wherein $Rf^1$ is the same as above, and
the amount of compound (I) being 1980 ppm or less, the amount of compound (II) being 80 ppm or less, and the total amount of the compounds (I) and (II) being 2000 ppm or less based on the amount of the fluorine-containing ether.

\* \* \* \* \*